United States Patent
Beyerle et al.

(10) Patent No.: US 9,268,342 B2
(45) Date of Patent: Feb. 23, 2016

(54) WATER HEATER WITH INTEGRAL THERMAL MIXING VALVE ASSEMBLY AND METHOD

(75) Inventors: Michael Thomas Beyerle, Peewee Valley, KY (US); Jonathan D. Nelson, Louisville, KY (US)

(73) Assignee: General Electric Company, Schenectady, NY (US)

(*) Notice: Subject to any disclaimer, the term of this patent is extended or adjusted under 35 U.S.C. 154(b) by 876 days.

(21) Appl. No.: 13/160,655

(22) Filed: Jun. 15, 2011

(65) Prior Publication Data

US 2012/0024968 A1    Feb. 2, 2012

(51) Int. Cl.
| | |
|---|---|
| G05D 23/13 | (2006.01) |
| F24H 1/18 | (2006.01) |
| F16K 31/00 | (2006.01) |
| F24H 9/20 | (2006.01) |
| F24D 19/10 | (2006.01) |

(52) U.S. Cl.
CPC .......... G05D 23/1346 (2013.01); F16K 31/002 (2013.01); F24H 1/18 (2013.01); *F24D 19/1051* (2013.01); *F24D 2220/0242* (2013.01); *F24H 9/2007* (2013.01); *F24H 9/2021* (2013.01); *Y10T 137/0329* (2015.04)

(58) Field of Classification Search
CPC ... F24H 9/2007; F24H 9/2014; F24H 9/2021; G05D 23/13; G05D 23/1306
USPC .................. 236/12.1, 12.11, 12.13, 20 R, 23
See application file for complete search history.

(56) References Cited

U.S. PATENT DOCUMENTS

| | | | |
|---|---|---|---|
| 3,705,574 A | 12/1972 | Duncan | |
| 4,036,433 A | 7/1977 | Wagner et al. | |
| 4,688,273 A | 8/1987 | Lyng | |
| 5,093,897 A * | 3/1992 | Peteri et al. | 392/450 |
| 5,176,317 A | 1/1993 | Park et al. | |
| 5,323,960 A | 6/1994 | Kline | |
| 5,347,956 A | 9/1994 | Hughes | |
| 5,808,277 A | 9/1998 | Dosani et al. | |
| 6,861,621 B2 | 3/2005 | Ghent | |
| 8,550,369 B2 * | 10/2013 | Subramanian | 236/20 R |
| 2007/0063060 A1 * | 3/2007 | Rivlin | 236/12.11 |
| 2009/0078218 A1 | 3/2009 | Gordon et al. | |

* cited by examiner

*Primary Examiner* — Marc Norman
(74) *Attorney, Agent, or Firm* — Dority & Manning, P.A.

(57) ABSTRACT

A water heater and thermal mixing valve assembly and method for providing a reduced discharge water temperature and a hot water temperature from the same tank. The assembly includes a tank adapted to accept and store an amount of cold water, a heater to heat the cold water held in the tank and increase the cold water temperature to a predetermined hot water temperature, at least one thermal mixing valve integrated with the tank in communication with a hot water passage and a cold water bypass conduit to provide a discharge water of a controlled temperature, the cold water bypass conduit being mounted to the cold water passage allowing the associated cold water to communicate with the tank and the thermal mixing valve. An adjustment member is mounted to the thermal mixing valve to adjust a temperature range of the discharge water, a discharge output passage and a hot output passage provide communication with an associated piping system oriented to supply discharge water from the thermal mixing valve and hot water from the tank to associated plumbing fixtures.

18 Claims, 3 Drawing Sheets

WATER HEATER WITH INTEGRAL THERMAL MIXING VALVE ASSEMBLY AND METHOD

BACKGROUND OF THE DISCLOSURE

The present disclosure relates to a water heater and thermal mixing valve assembly and method for providing and controlling a reduced discharge water temperature and a hot water temperature to an associated domestic water system.

Water heaters are a major appliance featured in domestic water systems used in all types of residential, commercial and industrial buildings. Generally, water heaters provide hot water to plumbing fixtures within a domestic water system for human consumption. Tank type water heaters are designed to store and continuously heat a given amount of water for on demand availability. Typical plumbing fixtures that rely on hot water from water heaters include faucets, tubs, showers, sinks, hose bibs, dish washers and washing machines. There exist numerous possible design arraignments for the use of water heaters within domestic water systems. However, water heaters generally provide hot water at one predetermined temperature for consumption within the system. This becomes a problem because different plumbing fixtures may require different hot water temperatures to operate correctly.

Plumbing fixtures such as sinks, faucets, bathtubs, and showers require a hot water temperature that is safe for human consumption by preventing the possibility of scalding injuries. Appliances such as washing machines, and dish washers typically require an increased hot water temperature for their intended purpose of cleaning clothes and dishes. Therefore, a demand exists to provide a water heater capable of producing hot water of variable temperature ranges to different plumbing fixtures based on the demanded water temperature of each device.

It is known to provide thermal mixing valves adjacent to each plumbing device within a domestic water system to maintain a safe and acceptable hot water temperature. Thermal mixing valves combine a hot water supplied by the water heater and an associated cold water supplied by an independent source to create a discharge water of a predetermined temperature acceptable for safe and effective use by the associated plumbing device. This approach requires a thermal mixing valve to be installed in proximity to each plumbing device that requires a different hot water temperature than the hot water supplied directly from the water heater. However, it is inefficient and uneconomical to provide a thermal mixing valve in proximity to every plumbing fixture because of excess pipe fitting materials and installation labor.

Another known application within domestic water systems is to provide a single thermal mixing valve in close proximity to the water heater. This application creates a discharge water temperature by combining the hot water from the water heater and the cold water from the associated independent source. The discharge water is individually piped to all necessary plumbing devices. This approach decreases the number of thermal mixing valves used in proximity to plumbing devices but increases the amount of labor and pipe fittings necessary to correctly install a water heater to an associated domestic water system.

BRIEF DESCRIPTION

The present disclosure relates to a water heater with an integral thermal mixing valve assembly and method for supplying and controlling a discharge water and a hot water to a domestic water system. The assembly includes a tank capable of accepting and storing an associated cold water, a heater for increasing the temperature of the associated cold water to a hot water temperature acceptable for general use within an associated plumbing system. The heater generally includes the use of an electric heating device or a gas burner apparatus with an associated flue venting structure.

A thermal mixing valve is operatively associated with the tank and is connected to a hot water passage for communication with the hot water stored within the tank and a cold water bypass conduit for communication with the associated cold water supplied by an independent source.

The thermal mixing valve combines hot water and cold water in a continually varying proportion so that it produces discharge water of a constant predetermined temperature that is cooler than the hot water temperature supplied by the tank. The water heater is provided with a hot output passage to dispense the hot water stored in the tank and a discharge output passage to dispense discharge water supplied by the thermal mixing valve. Both the hot output passage and the discharge output passage are mounted about the perimeter of the tank in one embodiment and may be connected to an associated domestic water system to provide various water temperatures to different plumbing fixtures.

A preferred embodiment of the present disclosure includes providing a controller for automated manipulation of the temperature range for both the discharge water and the hot water. The controller is adapted to manipulate the intensity of the heater. The heater can increase or decrease the temperature of the hot water held in the tank. Controllers are generally known within the prior art. The controller may also be adapted to regulate the amount of associated cold water supplied to the tank as well as the amount of discharge water and hot water supplied to the associated domestic water system.

Another embodiment of the present disclosure includes providing the thermal mixing valve with an adjustment knob to alter the temperature of the discharge water. The body of the thermal mixing valve can be mounted along the inner boundary of the tank to allow the adjustment knob to protrude through the tank wall. This allows for access to the adjustment knob for modification of the discharge water temperature without having to shut down the water heater.

Yet another embodiment of the present disclosure includes remotely adapting the bypass conduit to the cold water passage at a location outside of the tank. The bypass conduit communicates with the thermal mixing valve through a bypass inlet passage mounted within the tank. The bypass inlet passage may include a control valve operatively adapted to the controller that can regulate an amount of cold water supplied to the thermal mixing valve.

An advantage of the present disclosure is an assembly for providing a water heater that can supply and control the temperature of a hot water and a discharge water supplied by the same tank for use in domestic water systems.

Another advantage of the present disclosure is an assembly that reduces the amount of labor and materials necessary to install a water heater to a domestic water system.

Previously known applications require more time to install the necessary additional piping hookups and valves.

A further advantage of the present disclosure relates to a method that provides hot water and discharge water to an associated domestic water system at a predetermined controlled temperature.

DETAILED DESCRIPTION OF THE INVENTION

The present disclosure relates to an assembly and method for providing a discharge water and a hot water from a tank to supply an associated domestic water system with safe and consumable heated water of various temperatures.

Figure 1:
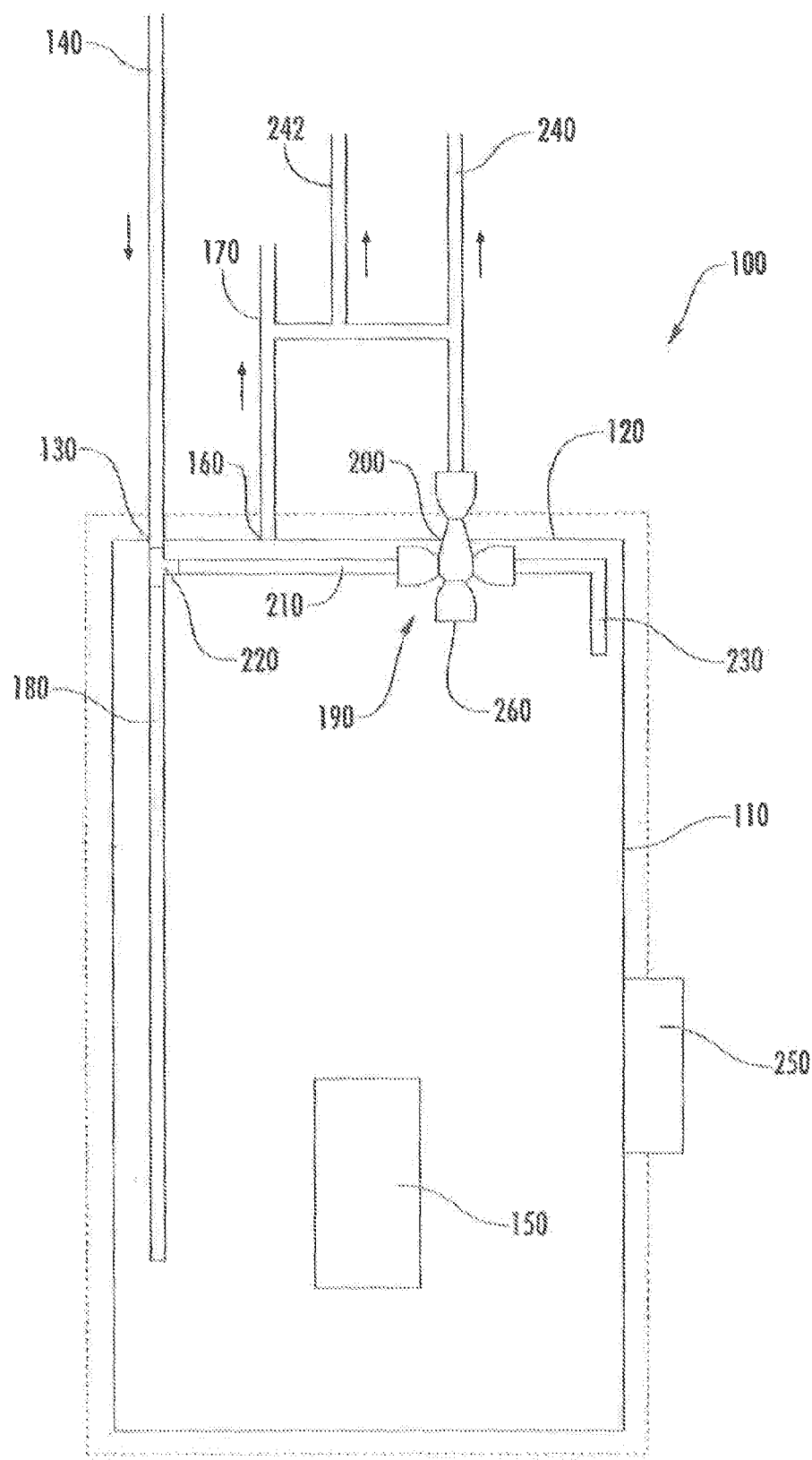
FIG. 1 is a schematic diagram of the assembly.

As shown in FIG. 1, a water heater with integral mixing valve assembly 100 with a tank 110 is adapted to accept and to hold water. The tank 110 is preferably a steel material with an exterior insulation to prevent heat loss and typically a bonded glass inner liner. The tank 110 though may be constructed of any material suitable to accept and store water. The tank 110 is generally cylindrical in shape but may embody various geometries. In the preferred arrangement, the tank maintains a substantially hermetic seal about its perimeter and around openings through a tank wall to protect the stored water from the outside environment and possible contamination.

The tank 110 has a top surface 120 having therein a cold inlet passage 130 to accept a supply of cold water. Cold water is supplied to the tank 110 from an independent source as it travels through a cold water passage 140 adapted to be in communication with the tank 110 through the cold inlet passage 130. Typically, cold inlet passage may include a valve such as a manual shut off valve, butterfly valve, ball valve, balancing valve or check valve. The cold inlet passage may also include an extension of pipe or a union coupling for a continuous connection between the tank 110 and the cold water passage 140. An alternate embodiment of the cold inlet passage 130 may include a control valve that may be operatively associated with a controller 250. The amount of cold water supplied to the tank 110 may be regulated to cold inlet passage 130 by the controller 250 discussed in more detail below. The cold water supplied is generally about 60 F. (16 C.) and usually passes through a dip tube 180 before finally settling in the tank 110. The dip tube extends to the bottom of the tank 110 to deliver cold water directly to a lower portion of the tank (not shown).

A heater 150 is located about the tank and may include any type of available heating system that is known within the prior art. Heaters associated with water heater assemblies typically include either an electric heating device or a gas burner apparatus with an associated flue venting structure located within the tank. A typical heater may run on electricity, natural gas, propane, fuel oil or other available energy sources. The heater 150 raises a temperature of the associated cold water that is supplied by the independent source and increases the cold water to a predetermined hot water temperature. The hot water may be stored or distributed from the tank 110 for use in the associated domestic water system. The predetermined hot water temperature can generally be set anywhere, for example, between 120 F. (49 C.) to 180 F. (82 C.) based on an associated user demand. The heater 150 is operatively connected to the controller 250 for regulation of the hot water temperature. Details of the heater 150 are well known in the prior art so that further discussion herein is unnecessary to a full and complete understanding of the present disclosure.

A hot outlet passage 160 stems from the top surface 120 of tank 110. The hot outlet passage 160 allows the water heater apparatus 100 to transmit hot water from the tank 110 to the associated domestic water system through a hot water passage 170. Typically, the outlet passage may include a valve such as a manual shut off valve, butterfly valve, ball valve, balancing valve or check valve. The outlet passage may also include an extension of pipe or a union coupling for a continuous connection between the tank 110 and the associated domestic water system. An alternate embodiment of the hot outlet passage 160 would include a control valve that may be operatively connected to the controller 250. The amount of hot water supplied to the hot outlet passage is regulated by the controller 250 discussed in more detail below.

A thermal mixing valve 190 is mounted to the tank 110 (shown here as being within the wetted, pressurized portion of the tank, although the controller 250 and/or mixing valve 190 are more likely a part of a non-wetted portion to provide greater flexibility). The thermal mixing valve 190 is adapted to combine the associated cold water with the hot water from the tank 110 to supply a discharge water of a specified temperature through a discharge outlet passage 200. The thermal mixing valve is connected to a cold water bypass passage or conduit 210 that is connected to the cold water passage 140 at bypass junction or connection point 220. The bypass connection point is located upstream of the dip tube 180. This orientation is adapted to provide cold water to the tank 110 through the dip tube 180 and also to the thermal mixing valve 190 through the bypass passage 210.

Figure 3:
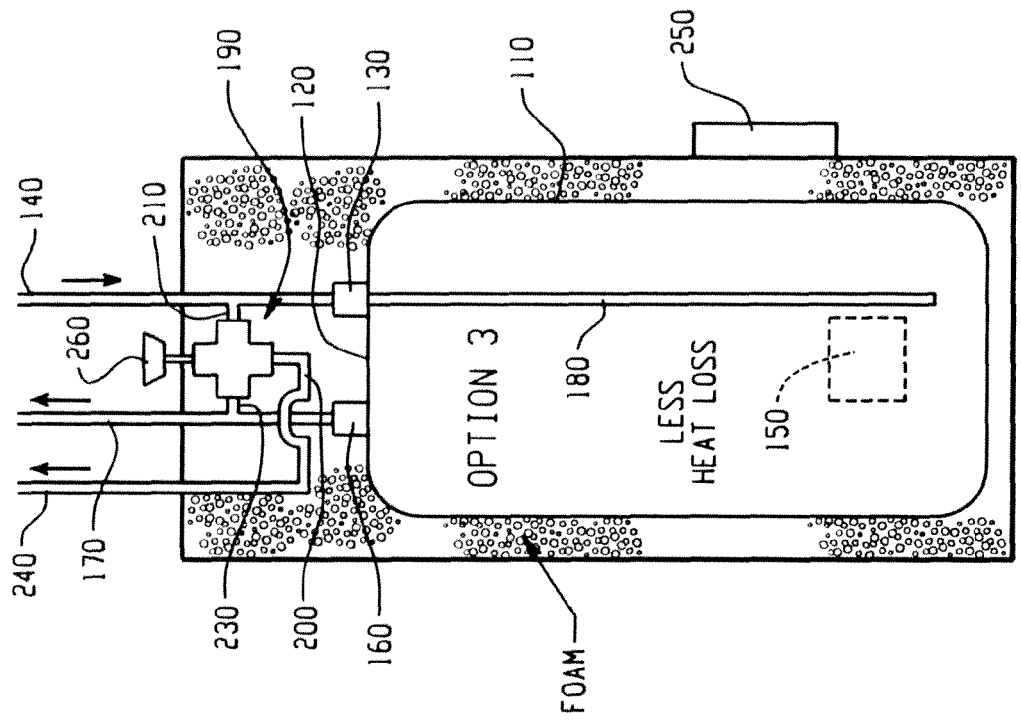
FIGS. 2 and 3 are illustrations similar to FIG. 1 of alternative locations of the mixing valve.
Figure 2:
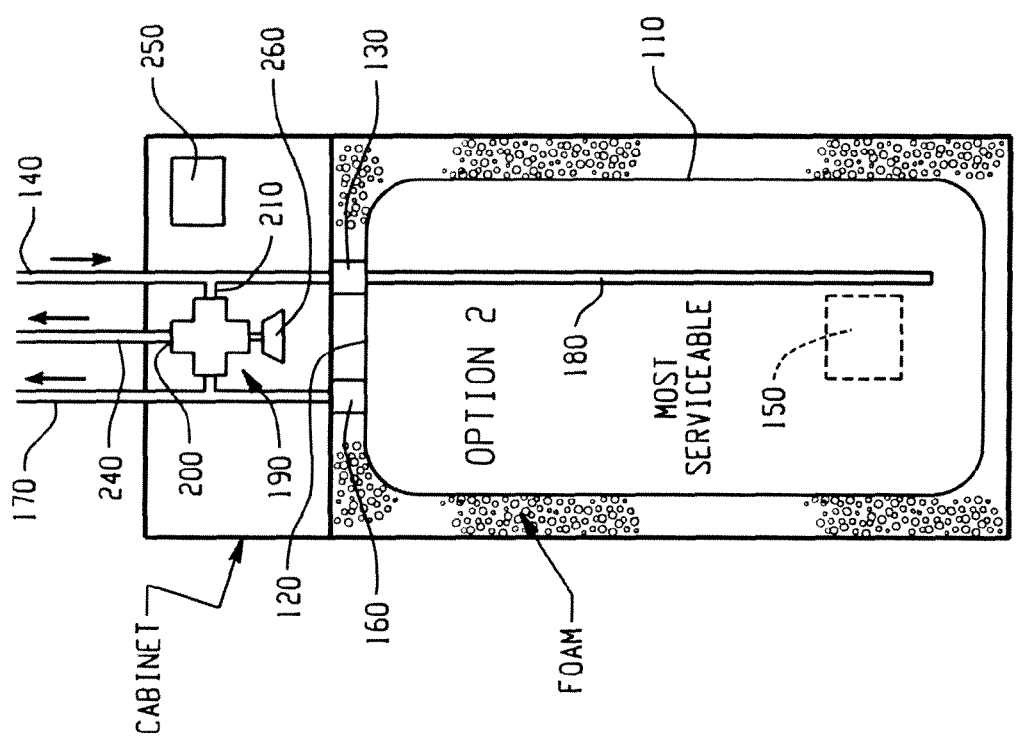

In first and second alternate embodiments shown in FIGS. 2 and 3, the bypass connection point 220 and thermal mixing valve 190 are physically located outside the tank. The primary distinction between the embodiments of FIGS. 2 and 3 is the location of the thermal mixing valve relative to the insulation (shown here as a foam insulation 222), namely incorporated external to the tank and insulation in FIG. 2 but still incorporated as an integrated part of the water heater 100 by inclusion within cabinet 224, while the thermal mixing valve is enveloped by the insulation in the embodiment of FIG. 3, as opposed to the illustrated location of the thermal mixing valve within the tank of FIG. 1. The option of FIG. 2 may be the most serviceable of the three illustrated embodiments, although for purposes of the present application, each is referred to as integrated to the hot water heater structure. In each instance, the hot water heater unit 100 is preferably delivered from the manufacturer equipped with all piping necessary in order to reduce labor and materials to incorporate and install the water heater in a domestic water system.

The thermal mixing valve 190 is connected to a hot water inlet 230 to allow the transfer of hot water from the tank 110 to the thermal mixing valve 190. The thermal mixing valve 190 is shown as being mounted adjacent to the top surface 120 of the tank and in close proximity to the discharge outlet passage 200. The thermal mixing valve 190 dispenses discharge water through the discharge outlet passage 200 to a discharge passage 240 to be supplied to the associated domestic water system.

The discharge outlet passage 200 may include a valve such as a manual shut off valve, butterfly valve, ball valve, balancing valve or check valve. The discharge outlet passage may also comprise an extension of pipe or a union coupling for a continuous connection between the thermal mixing valve 190 of the tank 110 and the associated domestic water system. An alternate embodiment of the discharge outlet means 200 includes a control valve that may be operatively connected to the controller 250. In this manner, the controller regulates the temperature of the discharge water supplied by the thermal mixing valve 190 based on the disposition of the controller 250 discussed in more detail below.

In an alternate embodiment of the present disclosure, the controller 250 is provided with the assembly 100. The controller 250 is generally known within the prior art and may encompass any manual, automatic or wireless controller devices typically used within Building Automated Systems (BAS) such that this disclosure is not intended to limit the use of any available combination or application of such devices.

The controller 250 can be adapted to increase or decrease thermal energy provided by the heater 150 to correspondingly raise or lower the hot water temperature of the water within the tank 110. The controller 250 may be programmed to provide certain levels of hot water temperature at predetermined times of the day. This feature allows a consumer to utilize less energy over the long term use. For example, a homeowner installs the present water heating assembly and programs the controller 250 to provide, for example, 140 F. (60 C.) hot water between preselected times such as between 7:00 am and 8:00 am for use during the peak morning hours for increased consumption of domestic water devices. During the remainder of the day, the hot water is set at a lower temperature, for example, 120 F. (49 C.), because there is less of a demand for hot water during those times. In the present example, this programming feature allows the consumer to save the energy needed to heat and store water and additional 20 F. (11 C.) for approximately 23 hours per day. Of course, this is a representative example only, and other temperature settings, time periods, etc. may be used without departing from the scope and intent of the present disclosure.

In an additional embodiment, the controller 250 can be adapted to regulate flow through the cold inlet passage 130, the hot outlet passage 160, the discharge outlet passage 200 and the bypass inlet passage. The controller would be operatively connected to valves associated with one or more of these passages that can be altered by the controller if desired. This provides dynamic control of all inputs and outputs of the assembly. The regulation of each input and output allows manipulation of the amount of cold water, discharge water, and hot water to and from the tank 110.

Figure 4:
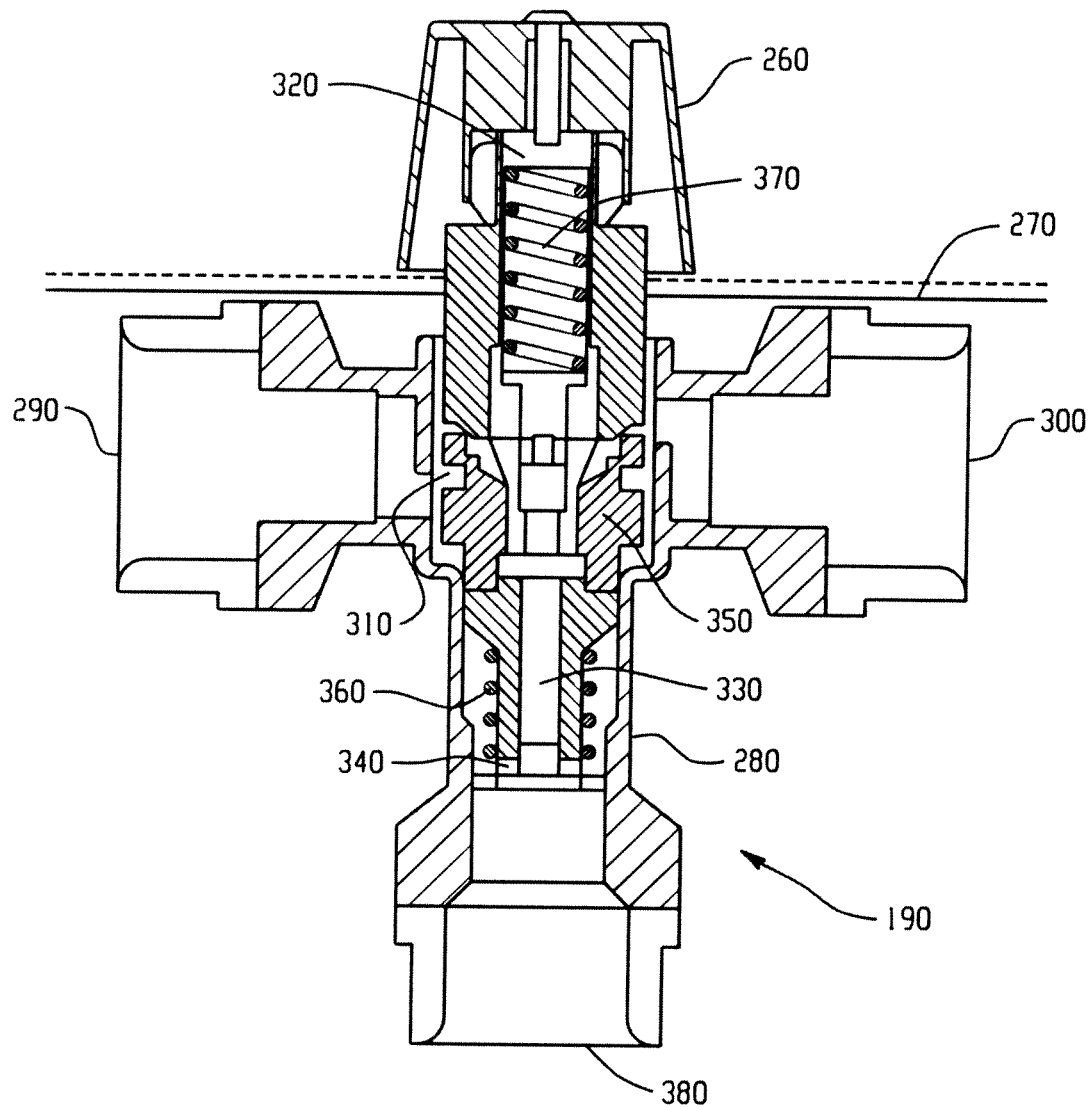
FIG. 4 is a cross sectional view of the thermal mixing valve.

In another alternate embodiment of the present disclosure, an adjustment member or knob 260 or a similar temperature setting device is provided for desired adjustment of the discharge water temperature range relative to the hot water temperature and cold water temperature. FIG. 4 depicts a cross-section of a typical thermal mixing valve mounted to the tank 110. The adjustment knob 260 is oriented to extend through the tank wall 270 while the body 280 of the thermal mixing valve 190 remains within the tank 110. Alternatively, the thermal mixing valve 190 may be provided without an adjustment knob and therefore would be mounted entirely within the tank 110. In the embodiments of FIGS. 1 and 3, the adjustment member or adjustment knob is located outside of the water heater and insulation while the mixing valve is located in the tank (FIG. 1) or in the foam insulation (FIG. 3)

With continued reference to FIG. 4, the body 280 of the thermal mixing valve 190 includes a hot port 290 and a cold port 300. The hot port 290 is connected to the hot inlet 230 an allows communication with the tank 110 to transport a desired amount of hot water from the tank 110 to thermal mixing valve mixing chamber 310. The cold port 300 is connected to the bypass conduit 210 and allows communication with the cold water passage 140 to transport a desired amount of cold water from the independent source to the mixing chamber 310.

The adjustment knob 260 can be manually operated to manipulate the temperature range of the discharge water relative to the temperatures of the hot water and the cold water. The adjustment knob 260 modifies the shaft assembly 320 within the body 280 of the thermal mixing valve 190. The shaft assembly 320 is adapted in line with a thermostat 330, a channel 340, and a nozzle 350 which are biased by springs 360, 370. The thermostat 330 typically comprises a wax material that contracts or expands in relation to the temperature of water introduced to the mixing chamber 310 in a manner generally known in the art so that further discussion of the structure and operation of the thermal mixing valve per se is not required, and other mixing valve designs can be used with equal success.

The thermostat 330 alters the position or placement of the nozzle 350 in relation to the hot port 290 and cold port 300 with the assistance of the springs 260, 370. The plunger 350 throttles hot water and cold water to the mixing chamber 310 to produce a discharge water of desired, substantially constant temperature. The desired temperature is achieved by the manipulation of the thermostat 330 in relation to a set point of the shaft assembly 320 as adjusted by the adjustment knob 260. As a result, the discharge water is supplied through the channel 340 to the discharge port 380. The discharge port 380 is connected to the discharge outlet passage 200 for communication with the discharge passage 240.

Of course, it will be appreciated that the above described manual adjustment member could be substituted with solenoid operated water valves, a gear/motor driven water valves controlled by an electronic controller, a resistance temperature detector (RTD), thermocouple, thermistor, etc. These alternative arrangements provide design flexibility and alternative control of the valves associated with above-described integrated thermal mixing valve for the water heater. For example, these alternate control schemes may have preferences of one over the other in certain situations and may vary in price, ease of assembly, accuracy, reliability, temperature ranges, etc. that allow the designer to provide the desired control or regulation of the mixing valve via the electronic controller.

The present disclosure is not limited to the use of the described thermal mixing valve. The present disclosure relates to any type of thermal mixing valve and is not limited to wax thermostat types as there exists other valves that are suitable for use within the present assembly for example bi-metallic type mixing valves. Additionally, a preferred embodiment includes the automated control of the adjustment knob on the thermal mixing valve 190. It is known to provide an automated actuator mounted to a thermal mixing valve for remote adjustment of the discharge water temperature. In this embodiment, the adjustment knob is adapted to the controller 250 for automatic regulation of the discharge water temperature.

Stated another way, water heaters for domestic hot water systems are typically set at a single temperature for use within a residence. These temperatures vary greatly depending upon the needs of the household. Low temperature hot water, approximately 125 F. (52 C.) or less, are generally used in households with younger children or the elderly to avoid the potential for scalding. S There are several problems with setting the tank water temperatures low. For example, lower temperature hot water supplied to dishwashers and washers may be lower than specified by the appliance manufacturer resulting in ineffective cleaning. Clothing and bedding washed in lower temperature hot water may not be properly sanitized. Water supplied to the kitchen faucet for use in manual cleaning may be lower than needed to effectively remove debris from dishes. Significantly, the amount of energy needed to supply the same quantity of hot water for the house will be affected (e.g. assume that 105 F. (41 C.) water is needed for a shower and that the incoming cold water temperature is 60 F. (16 C.)). A 40 gallon (151 L) tank of 160 F. (71 C.) hot water in conjunction with 60 F. (16 C.) cold water will supply 90 gallons (341 L) of 105 F. (41 C.) shower water. A 40 gallon tank of 125 F. (52 C.) hot water in conjunction 60 F. (16 C.) incoming water will supply only 57 gallons (216 L) of 105 F. (41 C.) shower water. One solution used to solve these problems is to incorporate the thermal mixing valve into the domestic water heater system, particularly on the water heater outlet so that water in the tank be heated to higher temperatures, increasing capacity, but also ensuring that outlet water temperatures are in the range desired by the consumer. As noted above, the system can be programmed to deliver different temperatures at different times of the day, and provide a higher output of hot water from a smaller tank. A consumer can replace the current water heater with a unit of equal footprint size but that has greater capacity, for example, when the family size increases or when demand for hot water rose. This allows the user to set the tank temperature high, and then to mix cold water into the supply line to regulate the temperature of the hot water supplied at the faucets. What has not been done is to add the thermal mixing valve to the tank itself, making it integral with the hot water tank. So now the hot water tank has two temperatures that it could supply, that is, the hot water tank temperature and the water at discharge temperature supplied by the mixing valve. The discharge water could be supplied to certain rooms and functions, such as the children's bathroom, in-law suite, etc. at one temperature and two different rooms or functions a different temperature. For example, the hotter tank water could be supplied to the dishwasher and the washing machine. This would allow for safety, sanitization and an increase quantity of hot water.

A further extension of this product would be to blend the mixing valve water and the tank water to provide water at a temperature in between the two settings. This extension 242 would allow users to have three temperatures, with no extra hardware and would allow water temperatures to be customized for a variety of uses throughout the house.

This written description uses examples to describe the present disclosure, including the best mode, and also to enable any person skilled in the art to make and use the present disclosure. However, the present disclosure includes these examples and other similar arrangements that fall within the scope of the following claims or equivalents thereof.

We claim:

1. A water heater with an integral thermal mixing valve assembly comprising:
    a tank configured to accept and hold an amount of an associated cold water;
    a cold water inlet passage to provide communication between a cold water source and the tank, the cold water source supplying the associated cold water to the tank from an independent source;
    a heater to modify the temperature of the associated cold water held within the tank to a specified temperature of hot water;
    a thermal mixing valve mounted within a wetted, pressurized portion of the tank and adjacent to a top surface of the tank, the thermal mixing valve comprising a cold water bypass conduit fluidly coupled to the cold water inlet passage allowing the associated cold water to communicate with the thermal mixing valve, and a hot water inlet allowing the hot water from the tank to communicate with the thermal mixing valve, the thermal mixing valve being configured to mix the hot water from the tank with the associated cold water to provide a discharge water at a specified temperature;
    at least one adjustment member mourned to the thermal mixing valve to manipulate the specified temperature of the discharge water, the at least one adjustment member extending from the thermal mixing valve through the wall of the tank to an area outside of the tank;
    a discharge output passage extending from the thermal mixing valve and configured tank to supply the discharge water from the thermal mixing valve to a first portion of an associated domestic water system;
    a hot water output passage extending from the tank configured to provide hot water from the tank to a second portion of the associated domestic water system; and
    an output passage that combines the hot water from the tank with the charge from the thermal mixing valve.

2. A water heater with an integral thermal mixing valve assembly of claim 1 wherein the adjustment member is accessible from the exterior of the water heater apparatus to allow manual adjustment to the specified temperature of the discharge water.

3. A water heater with an integral thermal mixing valve assembly of claim 1 wherein a controller is operatively connected to the thermal mixing valve to regulate the specified temperature of the discharge water.

4. The hot water heater of claim 3, wherein the thermal mixing valve is an electronically controlled mixing valve and wherein the controller is configured to automatically adjust the thermal mixing valve to change the specified temperature of the discharge water based on a pre-determined hot water temperature program.

5. A water heater with an integral thermal mixing valve assembly of claim 1 wherein at least one controller is operatively connected to the heater, the cold inlet passage, the discharge outlet passage, and the hot outlet passage to control flow therethrough.

6. A water heater with an integral thermal mixing valve assembly of claim 5 wherein the controller regulates the specified temperature of the discharge water and the hot water at predetermined times.

7. A water heater with an integral thermal mixing valve assembly of claim 5 wherein the controller is configured to automatically control the heater to modify the specified temperature of the hot water.

8. A water heater with an integral thermal mixing valve assembly of claim 7 wherein the controller provides for different temperature water to different end uses.

9. A water heater with an integral thermal mixing valve assembly of claim 8 wherein a bypass inlet means is configured to be controlled by the controller for automated manipulation of the associated cold water supplied to the thermal mixing valve.

10. The hot water heater of claim 1, comprising insulation within the cabinet surrounding the tank the thermal mixing valve being enveloped by the insulation.

11. A method for supplying a discharge water and a hot water from a water heater assembly comprising;
    providing a tank configured to accept and hold an associated cold water supplied by an independent source through a cold inlet passage;
    heating the associated cold water within the tank to a specified temperature of hot water;
    providing at least one thermal mixing within a wetted, pressurized portion of the tank, the at least one thermal mixing valve being disposed adjacent a top surface of the tank and providing communication between the cold water from a cold water passage and the hot water from the tank, the thermal mixing valve combining the hot water and the cold water to create a discharge water of a specified temperature that is cooler than the specified temperature of the hot water within the tank;
    providing at least one adjustment member mounted to the thermal mixing valve to manipulate the specified temperature of the discharge water, the at least one adjustment member extending from the thermal mixing valve through the wall of the tank to an area outside of the tank;

providing at least one discharge outlet passage to discharge water from the thermal mixing valve to an associated domestic water system; and providing at least one hot output passage to provide hot water stored in the tank to the associated domestic water system; and providing an output passage that combines the hot water from the tank with the discharge from the thermal mixing valve.

12. A method of claim 11 wherein at least one controller is provided for automated control of the heater, flow through the cold inlet passage, the discharge outlet passage and the hot outlet passage.

13. A method of claim 12 wherein the controller provides a specified temperature range of hot water and discharge water at specified times.

14. A method of claim 12 wherein the controller automatically modifies a temperature range of the hot water.

15. A method of claim 14 wherein the controller regulates an amount of hot water from the hot outlet passage at specified times.

16. A method of claim 11 wherein at least one adjustment member is operatively associated with the thermal mixing valve to adjust the specified temperature of the discharge water.

17. A method of claim 16 wherein the adjustment member is manipulated manually.

18. A method of claim 16 wherein the adjustment member is operatively connected to the controller for automatic regulation.

* * * * *